(12) United States Patent
Smith et al.

(10) Patent No.: US 12,386,639 B1
(45) Date of Patent: Aug. 12, 2025

(54) APPARATUS AND METHOD FOR DYNAMIC GENERATION OF VISUAL ELEMENTS IN A USER-INTERFACE

(71) Applicant: The Strategic Coach Inc., Toronto (CA)

(72) Inventors: Barbara Sue Smith, Toronto (CA); Daniel J. Sullivan, Toronto (CA)

( * ) Notice: Subject to any disclaimer, the term of this patent is extended or adjusted under 35 U.S.C. 154(b) by 0 days.

(21) Appl. No.: 18/927,243

(22) Filed: Oct. 25, 2024

(51) Int. Cl.
*G06F 9/451* (2018.01)

(52) U.S. Cl.
CPC .................................. *G06F 9/451* (2018.02)

(58) Field of Classification Search
CPC ....................................................... G06F 9/451
See application file for complete search history.

(56) References Cited

U.S. PATENT DOCUMENTS

| | | | |
|---|---|---|---|
| 8,301,472 B2 | 10/2012 | Notea | |
| 2017/0116552 A1 | 4/2017 | Deodhar et al. | |
| 2018/0174060 A1* | 6/2018 | Velez-Rojas | G06N 5/02 |
| 2020/0065924 A1* | 2/2020 | Cronin | G06F 40/20 |
| 2022/0068263 A1* | 3/2022 | Roy | G06F 40/30 |
| 2024/0203094 A1* | 6/2024 | Maitra | G06V 10/774 |

FOREIGN PATENT DOCUMENTS

| | | | |
|---|---|---|---|
| AU | 2013100242 A4 | | 3/2013 |
| IN | 202311046021 | * | 4/2023 |
| IN | 202311046021 A | | 8/2023 |

OTHER PUBLICATIONS

WillDom, 5 Ways You Can Use Data Analytics for Employee Performance Evaluation WillDom Blog, May 31, 2024.
Intelogos Team, Enhance Performance with Data Analytics, Intelogos, Mar. 6, 2024.

* cited by examiner

*Primary Examiner* — Andrey Belousov
(74) *Attorney, Agent, or Firm* — Caldwell Intellectual Property Law

(57) ABSTRACT

An apparatus and method for dynamic generation of visual elements in a user-interface. The apparatus includes at least a processor and a memory communicatively connected to the at least a processor. The memory instructs the processor to receive a first entry and a second entry of a plurality of log data, categorize the first entry into at least a first category of a first plurality of categories and the second entry into at least a second category of a second plurality of categories, generate key entries, assign a first score to the first entry and a second score to the second entry as a function of key entries, dynamically generate a first dashboard, modify the first dashboard based on the score of a second entry to produce a second dashboard comprising a second plurality of categories associated with at least a second visual element, display the second dashboard.

18 Claims, 8 Drawing Sheets

APPARATUS AND METHOD FOR DYNAMIC GENERATION OF VISUAL ELEMENTS IN A USER-INTERFACE

FIELD OF THE INVENTION

The present invention generally relates to the field of machine learning. In particular, the present invention is directed to an apparatus and a method for dynamic generation of visual elements in a user-interface.

BACKGROUND

In user-interface design, providing an efficient and intuitive experience for users across various phases of tracking data has become a critical focus for developers. Traditional methods often rely on pre-defined, static visual elements within the interface, which can limit the flexibility and adaptability needed for diverse user requirements. As user needs evolve, there is a growing demand for systems that dynamically generate and configure visual elements, allowing for real-time customization and enhanced interaction.

SUMMARY OF THE DISCLOSURE

In an aspect, an apparatus for dynamic generation of visual elements in a user-interface includes at least a processor and a memory communicatively connected to the at least a processor. The memory contains instructions configuring the processor to receive a first entry and a second entry of a plurality of log data, categorize the first entry into at least a first category of a first plurality of categories and the second entry into at least a second category of a second plurality of categories, generate key entries, wherein generating key entries comprises identifying one or more correlations between an entry and at least a category, assign a first score to the first entry and a second score to the second entry as a function of key entries, dynamically generate, using a user-interface generator, a first dashboard comprising the first plurality of categories associated with at least a first visual element of a plurality of visual elements, wherein the first dashboard is generated as a function of a first score assigned to the first entry, modify, using the user-interface generator, the first dashboard based on a second score of a second entry to produce a second dashboard comprising a second plurality of categories associated with at least a second visual element, display, using a downstream device, the second dashboard.

In another aspect, a method for dynamic generation of visual elements in a user-interface includes receiving, using at least a processor a first entry and a second entry of a plurality of log data, categorizing, using the at least a processor, the first entry into at least a first category of a first plurality of categories and the second entry into at least a second category of a second plurality of categories, generating, using the at least a processor, key entries, wherein generating key entries comprises identifying one or more correlations between an entry and at least a category, assigning, using the at least a processor, a first score to the first entry and a second score to the second entry as a function of key entries, dynamically generating, using a user-interface generator, a first dashboard comprising the first plurality of categories associated with at least a first visual element of a plurality of visual elements, wherein the first dashboard is generated as a function of a first score assigned to the first entry, modifying, using the user-interface generator, the first dashboard based on a second score of a second entry to produce a second dashboard comprising a second plurality of categories associated with at least a second visual element, displaying, using a downstream device, the second dashboard.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for dynamic generation of visual elements in a user-interface. The apparatus includes at least a computing device comprised of a processor and a memory communicatively connected to the processor. The memory instructs the processor to receive a first entry and a second entry of a plurality of log data. The processor categorizes the first entry into at least a first category of a first plurality of categories and the second entry into at least a second category of a second plurality of categories. The processor generates key entries, wherein generating key entries comprises identifying one or more correlations between an entry and at least a category. Additionally, the processor assigns a first score to the first entry and a second score to the second entry as a function of key entries. The processor dynamically generates, using a user-interface generator, a first dashboard comprising the first plurality of categories associated with at least a first visual element of a plurality of visual elements, wherein the first dashboard is generated as a function of the first score assigned to the first entry. The memory then instructs the processor to modify, using the user-interface generator, the first dashboard based on the second score of a second entry to produce a second dashboard comprising a second plurality of categories associated with at least a second visual element. The processor displays, using a downstream device, the second dashboard.

Figure 1:
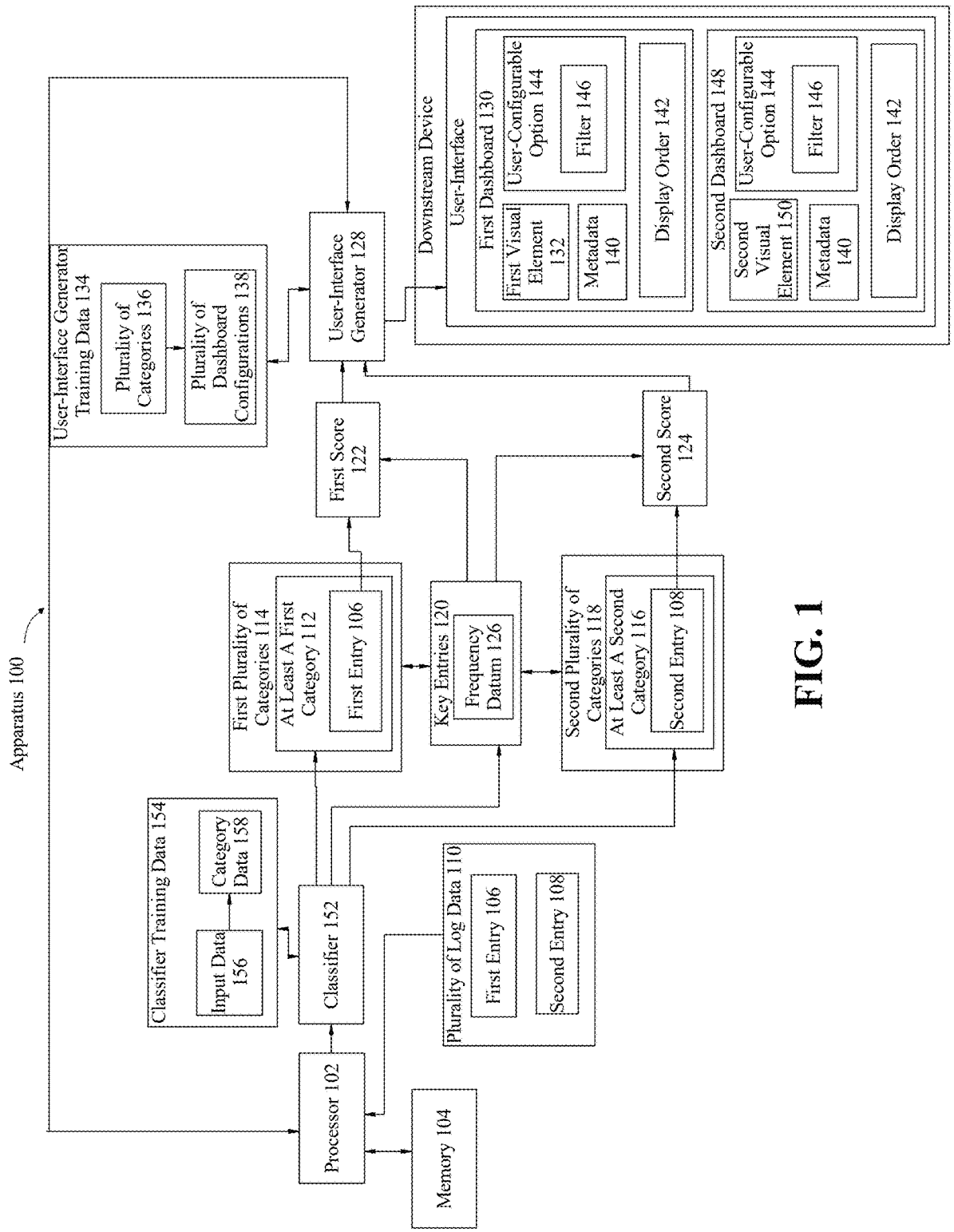
FIG. 1 is a block diagram of an apparatus for dynamic generation of visual elements in a user-interface.

Referring now to FIG. 1, an exemplary embodiment of apparatus 100 for dynamic generation of visual elements in a user-interface is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 102. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor 102 power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, a "graphical user-interface (GUI)" is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Without limitation, the graphical user-interface may include at least an event handler. An "event handler," as used in this disclosure, is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, May compare data to validation rules such as requirements that the data in question be entered within certain numerical ranges, and/or may modify data and/or generate warnings to a user in response to such requirements.

Still referring to FIG. 1 the processor 102 is configured to receive a first entry 106 and a second entry 108 of a plurality of log data 110. As used in this disclosure, a "first entry" is a data point or record that is an initial entry. In a non-limiting example, the first entry 106 may be the initial entry among a series of entries within a dataset, such as log data, which is processed or referenced by the system. As used in this disclosure, "log data" is a record of events, activities, or inputs captured over time by a system or application. Without limitation, log data may include temporal data and qualitative data. For example, log data may include entries such as timestamps of user actions, details of achievements logged by the user (e.g., "completed task A at 10:15 AM"), system events (e.g., "badge earned for completing five tasks"), or user habits recorded over a period of time (e.g., "spent 30 minutes on productive tasks daily for the past week"). As used in this disclosure, "temporal data" is information related to time. For example, temporal data may include timestamps indicating when specific events or actions occurred. Continuing, temporal data may help in tracking the sequence of events, monitoring the duration of processes, or analyzing trends over time. For example, log entries often contain timestamps to record when a user logs in, when a server request is processed, or when an error occurs. As used in this disclosure, "quantitative data" is descriptive information that provides context or attributes related to events, actions, or system states. For instance, without limitation, qualitative data may include information such as error messages, descriptions of user actions, or status updates. Continuing, the quantitative data may help in understanding the nature of logged events, providing details that aid in diagnosing issues or analyzing user behavior.

With continued reference to FIG. 1, as used in this disclosure, a "second entry" is a data point or record that follows the first entry. In a non-limiting example, the second entry 108 may be a subsequent entry in a sequence within a dataset, such as log data, and is processed or referenced by the system after the first entry 106. As used in this disclosure, a "plurality of log data" is a collection of multiple log records or data points generated by a system or device. In a non-limiting example, the plurality of log data 110 may be stored in sequence and used for tracking events, activities, or system states over time. In a non-limiting example, the plurality of log data 110 may consist of text-based logs, video recordings, voice messages, a combination of various data types stored sequentially, and the like. Continuing, these entries may track a user's activities over time, such as wins and losses in life, with each entry contributing to a user's progress toward certain goals and/or achievements.

Without limitation, each entry may contribute to the overall tracking of the user's state, helping to identify trends or deviations over time.

In a non-limiting example, the at least a processor 102 may normalize the entries before processing the entries. For example, without limitation, the normalization process may include the process of standardizing the format and structure of the incoming data. For instance, the entries may include images, text, voice, video, and the like. For example, without limitation, the processor 102 may convert all timestamps to a consistent format or transcribe voice entries into text for uniformity. In another non-limiting example, video data could be compressed or converted into frames for efficient processing. Continuing, the normalization process allows the processor 102 to handle different types of entries more efficiently and accurately.

With continued reference to FIG. 1, the user-interface may utilize vectors and matrices to manage and render at least a visual element. A "vector" as defined in this disclosure is a data structure that represents one or more quantitative values and/or measures the position vector. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below.

Any vectors as described herein may be scaled, such that each vector represents each attribute along an equivalent scale of values. Each vector may be "normalized," or divided by a "length" attribute, such as a length attribute 1 as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm' is a scalar value, denoted $\|\alpha\|$ indicating the vector's length or size, and may be defined, as a non-limiting example, according to a Euclidean norm for an n-dimensional vector a as:

$$\|a\| = \sqrt{\sum_{i=0}^{n} a_i^2}$$

As used in this disclosure "matrix" is a rectangular array or table of numbers, symbols, expressions, vectors, and/or representations arranged in rows and columns. For instance, and without limitation, matrix may include rows and/or columns comprised of vectors representing [whatever data in your case], where each row and/or column is a vector representing a distinct [data element]; [data element] represented by vectors in matrix may include all [an example of data element] as described above as [how the example data element is generated, identified, or determined], including without limitation [another example of data element] as described above. As a non-limiting example matrix may include [an example relationships between plurality of data elements].

Matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix VT represents right singular vectors consisting of an orthogonal matrix of n rows and n columns according to the vectors consisting of an orthogonal matrix of n rows and n columns according to the function:

$$A_{m \times n} = U_{m \times m} S_{m \times n} V_{n \times n}^T$$

singular value decomposition function may find eigenvalues and eigenvectors of $AA^T$ and $A^T A$. The eigenvectors of $A^T A$ may include the columns of VT, wherein the eigenvectors of $AA^T$ may include the columns of U. The singular values in S may be determined as a function of the square roots of eigenvalues $AA^T$ or $A^TA$, wherein the singular values are the diagonal entries of the S matrix and are arranged in descending order. Singular value decomposition may be performed such that a generalized inverse of a non-full rank matrix may be generated.

With continued reference to FIG. 1, the apparatus may include a large language model (LLM). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, professional documentation, personal development resources, performance-related data, organizational records, communication logs, business correspondence, industry reports, growth assessments, user-generated content, and the like. In some embodiments, training sets of an LLM may include information from one or more public or private databases. As a non-limiting example, training sets may include databases associated with an entity. In some embodiments, training sets may include portions of documents associated with at least a first category 112 correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "I am feeling", then it may be highly likely that the word "happy" or "sad" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It is also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with the plurality of log data 110.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Still referring to FIG. 1 the processor 102 is configured to categorize the first entry 106 into at least a first category 112 of a first plurality of categories 114 and the second entry 108 into at least a second category 116 of a second plurality of categories 118. As used in this disclosure, a "first plurality of categories" is a collection of multiple distinct groupings or classifications into which a first entry 106 may be categorized based on specific attributes, characteristics, or criteria relevant to the data. In a non-limiting example, the first plurality of categories 114 may include categories such as "personal," "career," "emotional," "spiritual," "health," and "financial." Continuing, the first entry 106 may consist of data like user achievements or activities, that could be categorized into one or more of these categories. For instance, an entry detailing a completed fitness goal may be categorized under "health," while another entry reflecting progress in professional development may fall under "career."

As used in this disclosure, a "second plurality of categories" is a collection of multiple distinct groupings or classifications into which a second entry 108 may be categorized, potentially based on different attributes, characteristics, or criteria than those used for the first plurality of categories 114. In another non-limiting example, the second plurality of categories 118 may include categories such as "social," "emotional well-being," "relationships," "mental health," and "physical health." Continuing, the second entry 108, such as a log of emotional progress or personal reflection, may be categorized under "emotional" or "spiritual," while a record of social interactions or friendships may be categorized under "relationships" or "social."

Without limitation, the categories may enable the at least a processor 102 to organize data efficiently, and allow one or more users to track their progress across different aspects of life, such as personal development, emotional health, or career goals. Without limitation, the second plurality of categories 118 and the first plurality of categories 114 may have overlapping categories.

Without limitation, there may be overlap between the first plurality of categories 114 and second plurality of categories 118, as many of the original categories (e.g., "personal," "health," "emotional") may remain relevant in their updated form. However, without limitation, the second plurality of categories 118 may provide a more refined or tailored set of groupings, allowing the apparatus to organize data in a way that aligns more closely with the user's specific goals, needs, or inputs. For example, without limitation, the user may initially categorize an entry under "health" in the first set of categories, and in the second set, this could be further divided into categories like "mental health" or "physical fitness" based on user interaction. Continuing, the overlap between sets of categories may ensure continuity, while the refinement allows for more detailed tracking and analysis as the user's preferences and activities evolve over time.

Still referring to FIG. 1 the processor 102 is configured to generate key entries 120, wherein generating key entries 120 comprises identifying one or more correlations between an entry and at least a category. As used in this disclosure, "key entries" are data points or records representing significant or relevant entries. In a non-limiting example, the key entries 120 May be identified by the at least a processor 102 by analyzing correlations between the entry and one or more categories. Without limitation, the key entries 120 may serve as reference points or benchmarks for assigning scores to other entries. For instance, without limitation, if a user logs multiple health-related activities such as workouts, meals, and sleep patterns, the processor 102 may identify a "key entry" as a particularly impactful workout that correlates strongly with the "health" and "fitness" categories. This key entry could represent a workout where the user exceeded performance benchmarks (e.g., ran longer or lifted heavier weights than usual). The processor 102 may then use this key entry as a benchmark for evaluating and assigning scores to future workouts, comparing them to this higher standard of performance In another non-limiting example, in a career-tracking application, a key entry may be a user's completion of an important certification. This entry might be correlated with the "career" and "professional development" categories, and its significance could be used to influence how the processor 102 scores other entries, such as additional training sessions or project milestones. The certification might serve as a reference point, leading the system to assign higher or lower scores to subsequent entries based on how they compare in relevance or impact to this key entry.

Still referring to FIG. 1 the processor 102 is configured to assign a first score 122 to the first entry 106 and a second score 124 to the second entry 108 as a function of key entries 120. As used in this disclosure, a "score" is a numerical or qualitative value assigned to an entry. In a non-limiting example, the score may represent the relevance, significance, performance, or weight of the entry based on specific criteria or correlations with categories. As used in this disclosure, a "first score" is a numerical or qualitative value assigned by the processor 102 to the first entry 106. In a non-limiting example, the first score 122 may represent the significance, relevance, or weight of the first entry 106 in relation to specific criteria or data. For instance, without limitation, a user's completed task may receive a score based on its importance to a personal or career-related goal, with higher scores assigned to tasks more closely aligned with the user's objectives. Similarly, a fitness achievement entry may receive a higher score if it contributes significantly to the user's health goals, such as completing a workout routine or reaching a new milestone in physical activity. For example, without limitation, if a user logs a "completed workout" entry, the processor 102 may assign a score of 85 out of 100, based on factors like workout duration, intensity, and its alignment with the user's health goals. Similarly, if the user logs a "career milestone" such as a completed certification, the processor 102 May assign a score of 90, reflecting the significance of this achievement in advancing the user's professional development. The scores help the system quantify and track progress in various categories like "health" and "career." As used in this disclosure, a "second score" is a numerical or qualitative value assigned by the processor 102 to the second entry 108. In a non-limiting example, the second score 124 may represent the significance, relevance, or weight of the second entry 108 in relation to specific criteria or data, and may be calculated independently or differently from the first score 122.

With continued reference to FIG. 1, scores may be weighted based on a frequency datum 126 associated with an entry of the plurality of log data 110. As used in this disclosure, a "frequency datum" refers to a data point that represents how often a particular entry or event occurs within a set of log data. In a non-limiting example, the frequency datum 126 may provide information that helps determine the regularity or recurrence of specific entries and can be used to influence the weighting of the score assigned to that entry. For instance, in a non-limiting example, if an entry such as "workout logged" occurs frequently within the log data, the frequency datum 126 associated with that entry could increase the score's weight, emphasizing the significance of consistent behavior. Conversely, if an entry occurs rarely, its frequency datum 126 may lower its score, reflecting its less frequent occurrence in the overall analysis. Continuing, the frequency datum 126 may allow the apparatus to prioritize regularly occurring activities or events when assigning scores and determining patterns.

With continued reference to FIG. 1, the user-interface generator 128 may utilize a neural network. Without limitation, the neural network may be trained to recognize patterns in user interactions such as how often the user interacts with certain categories like "health" or "career." Continuing, based on this, the neural network may predict which visual elements are most relevant and dynamically generate a dashboard that highlights these elements, improving user experience and efficiency. For example, without limitation, the neural network might analyze thousands of past user interactions to determine that users frequently check their "fitness" category in the morning, and could dynamically position fitness-related data more prominently on the dashboard during that time of day.

Still referring to FIG. 1 the processor 102 is configured to dynamically generate, using a user-interface generator 128, a first dashboard 130 comprising the first plurality of categories 114 associated with at least a first visual element 132 of a plurality of visual elements, wherein the first dashboard 130 is generated as a function of the score assigned to the first entry 106. As used in this disclosure, a "user-interface generator" is a component designed to dynamically create and update graphical user-interfaces. In a non-limiting example, the user-interface generator 128 may be responsible for generating dashboards, visual elements, and controls based on user input or the plurality of log data 110, enabling the user to visualize and manage entries and categories.

With continued reference to FIG. 1, the user-interface generator 128 may employ a machine learning model, such as a deep learning model, to analyze large datasets of user interactions and behaviors to generate more intuitive and personalized interfaces. The machine learning model may be trained on historical data, such as previous user inputs, preferences, and interactions with various categories, to optimize the design and arrangement of visual elements on the dashboard.

With continued reference to FIG. 1, the user-interface generator 128 may include deep learning. As used herein, deep learning refers to a subset of machine learning where the model is built using multiple layers of neural networks. Continuing, these deep neural networks may be particularly effective for recognizing complex patterns in large datasets, such as the plurality of log data 110. In a non-limiting example, the user-interface generator 128 may use deep learning models to handle more complex tasks, such as predicting which visual elements the user will need based on subtle cues, like recent behavior or long-term goals. The deep learning model may update the dashboard in real-time as new data is logged or new scores are assigned to entries. In a non-limiting example, a deep learning-based user-interface generator 128 may analyze a user's daily activities across multiple categories (such as health, career, and emotional well-being) to generate the first dashboard 130 that is highly personalized. Continuing, the user-interface generator 128 may recognize patterns, such as a user focusing more on "health" during weekdays and "career" over weekends.

Continuing, based on these insights, the user-interface generator 128 may dynamically adjust the layout, showing more "career" progress bars, graphs, or icons when the user is more likely to engage with those elements.

With continued reference to FIG. 1, the user-interface generator 128 may be trained on user-interface generator training data 134 comprising a plurality of categories 136 corresponding to a plurality of dashboard configurations 138. As used in this disclosure, a "plurality of categories" refers to multiple distinct groups, types, or classifications, each representing a set of items, characteristics, or data. As used in this disclosure, a "plurality of dashboard configurations" is to multiple different arrangements, layouts, or setups of a dashboard interface. As used in this disclosure, "user-interface generator training data" is a dataset that is used to train the user-interface generator 128 to understand and predict optimal dashboard configurations. Without limitation, the user-interface generator training data 134 may include of examples of various dashboard layouts, user interactions, and visual element placements, each corresponding to a plurality of categories 136. Without limitation, the user-interface generator training data 134 may enable the user-interface generator 128 to learn patterns and preferences in dashboard configurations, allowing the user-interface generator 128 to dynamically generate and adjust user-interfaces based on user behavior, preferences, or specific data requirements. In a non-limiting example, user-interface generator training data 134 may include a history of user interactions with dashboards that track health, career, and financial goals. Continuing, the user-interface generator 128 may encompass different configurations of visual elements, such as progress bars, charts, and graphs, associated with these categories. Continuing, the user-interface generator 128 may automatically suggest or configure the most appropriate dashboard layout for a new user or situation. Continuing, the user-interface generator 128 may continue learning from real-time user interactions, refining its predictions and dashboard layouts through reinforcement learning or continuous model training, allowing the system to become more accurate over time.

With continued reference to FIG. 1, as used in this disclosure, a "dashboard" is a user-interface that displays a collection of data, visual elements, and controls in an organized and interactive manner. In a non-limiting example, the dashboard may allow users to monitor, track, and interact with various entries, categories, and system metrics, often summarizing complex information into easily understandable visual components like charts, graphs, and progress indicators. As used in this disclosure, a "visual element" is an individual component that expresses an idea and/or conveys a message. A visual element may include visual data such as, but not limited to, images, colors, shapes, lines, arrows, icons, photographs, infographics, text, any combinations thereof, and the like. A visual element may include any data transmitted to display device, client device, and/or graphical user-interface. In some embodiments, visual element may be interacted with. For example, visual element may include an interface, such as a button or menu. In some embodiments, visual element may be interacted with using a user device such as a smartphone, tablet, smartwatch, or computer. As used in this disclosure, a "plurality of visual elements" refers to multiple graphical components displayed on the dashboard. In a non-limiting example, the plurality of visual elements may represent different categories, data points, or other interface elements. In a non-limiting example, the plurality of visual elements could include multiple charts, icons, graphs, or interactive components that allow the user to view data from different categories or interact with various aspects of the system, such as scores or achievements.

With continued reference to FIG. 1, the plurality of visual elements may include a status indicator configured to compare the plurality of log data 110 to a second plurality of log data. As used in this disclosure, a "status indicator" is a visual element within a user-interface designed to convey the current state, progress, or comparison of specific data. In a non-limiting example, the status indicator may highlight performance, completion levels, or rankings of the plurality of log data 110 relative to other data sets. Continuing, the comparison may involve analyzing patterns, scores, or metrics over time or against other datasets. For example, without limitation, the status indicator may include a leadership board. As used in this disclosure, a "leadership board" is a type of status indicator that displays rankings or scores of individuals, teams, or entities based on certain criteria. In a non-limiting example, the leadership board may be used in a fitness category context to compare user performance, such as total calories burned or workout consistency, against other users over a defined period. Continuing, the leadership board may provide a visualization of each user's ranking based on their accumulated data, providing a competitive and motivational tool. In another non-limiting example, a task management dashboard may include a status indicator to track the completion of tasks within a project. Continuing, the status indicator may show a percentage of tasks completed or display a color-coded bar (e.g., green for completed tasks, yellow for in-progress, and red for overdue), comparing the user's progress with that of team members or project deadlines. Continuing the previous non-limiting example, the dashboard may display a status indicator showing how close a user is to meeting their savings or budget goals. For instance, the status indicator may compare the user's current savings log data to a projected savings target over time, dynamically updating based on spending patterns and income logs.

With continued reference to FIG. 1, the at least a processor 102 may be further configured to dynamically inject data, using the user-interface generator 128, into one or more of the plurality of visual elements during runtime and update, using the user-interface generator 128, the plurality of visual elements in real time based on changes in the log data. As used in this disclosure, "data injection" is the process of dynamically adding or updating data in a user-interface in real-time. In a non-limiting example, the data injection technique may allow visual elements, such as charts or graphs, to reflect the most current information without requiring a manual refresh or user action.

In a non-limiting example, the processor 102 may be configured to dynamically inject data into one or more visual elements during runtime. For instance, in a health tracking dashboard, the processor 102 may use the user-interface generator 128 to update a "calories burned" progress bar in real-time as the user logs workout sessions throughout the day. Continuing, each time the at least a processor 102 receives an entry, like a user logging a new workout, the progress bar may adjust instantly, reflecting the cumulative effect of the day's activities. Without limitation, this dynamic data injection allows the user to see their real-time progress without needing to refresh or reload the dashboard.

In another non-limiting example, in a financial dashboard, the processor 102 may dynamically inject data related to stock market updates or budget tracking. For example, without limitation, as the user logs new expenses or as market values fluctuate, the processor 102 may update graphs or charts showing the user's financial status in real-time. For example, a pie chart representing a budget may automatically update to reflect changes in spending, ensuring that the user always has access to the most current data. Continuing, the real-time updates may provide an interactive experience where users can make informed decisions immediately based on the latest data. In another non-limiting example, the processor 102 may be configured to handle real-time updates in a productivity or task management dashboard. For instance, as the user completes tasks or logs new entries, the processor 102 may dynamically update a task progress visual element, such as a Gantt chart or a daily to-do list. Continuing, the chart may automatically adjust to display new deadlines, completed tasks, or project milestones, providing real-time insights into the user's progress. Continuing, the dynamic injection of data may enable users to efficiently track and adjust their personalized dashboard based on real-time activity and progress changes.

With continued reference to FIG. 1, as used in this disclosure, a "first dashboard" is a user-interface display generated by a user-interface generator. In a non-limiting example, the first dashboard 130 may present a collection of data or visual elements to the user in an organized format. In a non-limiting example, the first dashboard 130 may present the first plurality of categories 114, such as "personal," "career," or "health," and their associated data in a visually structured layout, making it easier for the user to track progress or performance. As used in this disclosure, a "first visual element" is a graphical component displayed on the first dashboard 130. In a non-limiting example, the first visual element 132 may represent a category, data point, or other interface component. In a non-limiting example, the first visual element 132 may include a graph, chart, progress bar, icon, and the like, representing a specific category like "health" or "career," allowing the user to quickly understand the status or score associated with the first entry 106.

With continued reference to FIG. 1, modifying the first dashboard 130 may include updating one or more of metadata 140 associated with the plurality of log data 110, the plurality of visual elements, and a display order 142. As used in this disclosure, "metadata" is descriptive information or attributes that provide context about the data. Without limitation, metadata 140 may be embedded in a visual element of the plurality of visual elements. In a non-limiting example, the metadata 140 may include details about when and how the plurality of log data 110 was collected, its source, or its format. In another non-limiting example, the metadata 140 may include information like timestamps, user IDs, entry types, or categories associated with each log entry. Continuing, the metadata 140 may help the processor 102 manage and organize the plurality of log data 110 more effectively by giving it more context. As used in this disclosure, a "display order" is an arrangement or sequence in which data or the visual elements are presented on the dashboard. In a non-limiting example display order 142 may include the order in which an entry of the plurality of log data 110 is listed, the positioning of the plurality of visual elements like charts and graphs, the hierarchy of categories, and the like are displayed to the user. Continuing, the display order 142 may be dynamically adjusted based on user preferences, relevance, or scores associated with the entries. Without limitation, the display order 142 may ensure that the most important or frequently accessed information is presented in a prioritized manner.

With continued reference to FIG. 1, the dashboard may include at least a user-configurable option 144 may include a filter 146, wherein the filter 146 dynamically updates the user-interface. As used in this disclosure, a "user-configurable option" is a setting or feature within the user-interface that allows the user to personalize or adjust the dashboard according to their preferences. In a non-limiting example, the user-configurable option 144 may involve selecting which data to display, choosing specific visual elements, or altering how information is organized. As used in this disclosure, a "filter" is to a tool within the user-interface that allows the user to narrow down or refine the data being displayed. In a non-limiting example, the filter 146 may enable the user to refine the data being displayed by setting specific conditions or criteria. Without limitation, the filter 146 may be applied to focus on particular categories, timeframes, or types of data, helping the user manage large datasets more efficiently. In a non-limiting example, the filter 146 may allow the user to display only log data from a specific date range or filter out certain categories, such as "health" or "financial" data. Continuing, the apparatus may dynamically update the user-interface based on the filter 146 settings, ensuring that only relevant information is shown to the user.

With continued reference to FIG. 1, when a user selects or modifies the filter 146, an event handler detects this action (e.g., a click or selection) and triggers the necessary function to apply the filter. Continuing, this allows the user-interface to update in real time, displaying the refined data based on the user's selection. For instance, without limitation, if the user sets the filter 146 to display data from the past week only, the event handler recognizes the user's input, applies the filter criteria, and updates the dashboard to show only relevant data from that time frame. This ensures that the GUI remains responsive and adaptive to the user's configurations, offering a tailored and efficient experience.

Still referring to FIG. 1 the processor 102 is configured to modify, using the user-interface generator 128, the first dashboard 130 based on the score of a second entry 108 to produce a second dashboard 148 which includes a second plurality of categories 118 associated with at least a second visual element 150. As used in this disclosure, a "second dashboard" is a user-interface generated by a user-interface generator to reflect updated data, categories, or visual elements. In a non-limiting example, the second dashboard 148 may be updated based on the second score 124 associated with the second entry 108. Without limitation, the second dashboard 148 may present a revised or reorganized set of information compared to the first dashboard 130, allowing the user to view or interact with the updated data. In a non-limiting example, the second dashboard 148 may display the "health" category more prominently after the second entry 108, such as a logged workout, receives a high score. Continuing, the second dashboard 148 may adjust to include a progress bar for fitness goals, updated graphs for calories burned, or new metrics for daily activity. In another non-limiting example, the second dashboard 148 may shift focus to a "career" category if the second entry 108, such as the completion of a work project, is assigned a high score. Continuing, the interface may highlight professional achievements, project timelines, or a graph displaying career progress. Without limitation, the second dashboard 148 may continuously adapt to reflect the most recent entries and scores. As used in this disclosure, a "second visual element" is a graphical component displayed on the second dashboard 148. In a non-limiting example, the second visual element 150 may represent a category, data point, or other interface component. In a non-limiting example, the second visual element 150 may include a graph, chart, progress bar, icon, and the like, representing a specific category like "health" or "career," allowing the user to quickly understand the status or score associated with the second entry 108.

With continued reference to FIG. 1, wherein categorizing the first entry 106 into the at least a first category 112 of the first plurality of categories 114 and the second entry 108 into the at least a second category 116 of the second plurality of categories 118 comprises classifying the first entry 106 and the second entry 108 using a classifier 152, wherein the classifier 152 is trained using classifier training data 154 including input data 156 corresponding to category data 158. The classifier 152 may include a computational model or algorithm that categorizes or assigns labels to data points based on specific features or patterns within the data. Without limitation, the classifier 152 may analyze input data 156, such as the plurality of log data 110, and classify it into predefined categories. In a non-limiting example, the classifier 152 may use techniques from machine learning or statistical analysis to make the classification decisions. as further defined in FIG. 3.

With continued reference to FIG. 1, the classifier 152 may include a Bidirectional Encoder Representations from Transformers (BERT) model configured to categorize the plurality of log data 110 based on a contextual data analysis. Contextual data analysis is a process of analyzing data by considering the surrounding context in which the data exists. Without limitation, contextual data analysis may focus on the relationships between different data points and their environments to derive deeper meaning and more accurate insights. The BERT model may be configured to categorize a plurality of log data 110 by analyzing not just the keywords, but the context in which those words appear, enabling more accurate classification of complex or ambiguous entries. For example, without limitation, if the log data contains entries like "completed a 5K run" or "attended a yoga class," the BERT model may analyze the contextual relationships between the words to determine that these entries belong to the "health" or "fitness" category. Continuing, the BERT model may understand the contextual meaning behind the phrases and thereby avoid misclassification. For instance, the BERT model may distinguish between "run" as a fitness activity and "run" in the context of an error message, where "run" might mean launching a program. The BERT model may dynamically analyze the aforementioned nuances, ensuring more accurate categorization based on the context in which the words appear. In another non-limiting example, the BERT model may process entries related to career development. For instance, an entry like "completed a project presentation" or "attended a leadership workshop" may be categorized under "career" or "professional development" categories. In a non-limiting example, the BERT model may analyze these phrases for key contextual cues, such as "presentation" and "workshop," and assign the correct categories based on the broader meanings of the entries. Continuing, this may permit the classifier 152 to differentiate between entries related to career achievements and other personal activities like social events or health-related goals, based on contextual patterns in the language. In another non-limiting example, the BERT model may handle plurality of log data 110 containing subjective or emotional language, such as "feeling anxious before the meeting" or "had a productive day." Without limitation, the BERT model may use its bidirectional understanding of language to categorize these entries into more nuanced categories like "emotional well-being" or "personal growth." Continuing, the BERT model may help the apparatus assign more appropriate categories to track emotional states and provide insights into areas that affect the user's overall well-being. Continuing, this may ensure that even subjective or vague data is classified accurately, enhancing the apparatus ability to understand and categorize complex user logs.

With continued reference to FIG. 1, the memory 104 may contain instructions further configuring the at least a processor 102 to generate a new category from the plurality of log data 110 when an entry frequency threshold is met using the classifier 152. As used in this disclosure, an "entry frequency" is the rate or number of times specific data entries or events are recorded within a given time frame. Without limitation, the entry frequency may measure how often certain logs, transactions, inputs, or records occur in a system, providing insight into patterns or trends in data entry or system activity. As used in this disclosure, a "new category" refers to a distinct classification or grouping created to categorize entries that do not fit within existing predefined categories. In a non-limiting example, the new category may be generated dynamically based on patterns in the plurality of log data 110 or as a result of user-defined preferences or behaviors that emerge over time. In a non-limiting example, the apparatus may introduce, using the at least a processor 102, a new category called "mindfulness" if it begins to recognize frequent entries related to meditation, relaxation exercises, or mindfulness sessions. Continuing, the new category may then allow the classifier 152 to group similar entries and assign scores or metrics relevant to that classification. Without limitation, the new category may enable the apparatus to remain flexible and adaptive, ensuring that entries are categorized meaningfully as user behavior evolves.

With continued reference to FIG. 1, as used in this disclosure, "classifier training data" is a dataset used to train the classifier 152. In a non-limiting example, the classifier training data 154 may provide examples that include both input data 156 and their corresponding category data 158, allowing the classifier 152 to learn patterns and relationships between the inputs and their associated categories. As used in this disclosure, "input data" is data points or features provided to the classifier 152 for analysis. In a non-limiting example, input data 156 may include various types of information, such as text, images, or numerical values, which the classifier 152 uses to identify patterns and make decisions about classification. For instance, the input data 156 may include the entry. As used in this disclosure, "category data" is predefined labels or classes that are associated with the input data 156. Without limitation, the labels indicate the correct classification for each data point in the training process. For example, category data 158 might include labels like "spam" or "not spam" in an email classification system, or "cat," "dog," and "car" in an image recognition system.

With continued reference to FIG. 1, a trained classifier 152 may be configured to categorize new entries by automatically identifying patterns in real-time data and assigning them to appropriate categories. For example, if the trained classifier 152 sees a log entry, such as, "1-hour workout," it may assign it to the "fitness" category based on previous training data. Similarly, an entry about "attending a workshop" may be categorized as "career" based on learned patterns from earlier data. Continuing, the classifier 152 may be refined with supervised learning, where the classifier 152 improves its accuracy over time by comparing its predictions with actual outcomes, ensuring more accurate future categorization.

Still referring to FIG. 1 the processor 102 is configured to display, using a downstream device, the second dashboard 148. As used in this disclosure, "downstream device" is a device that accesses and interacts with apparatus 100. For instance, and without limitation, downstream device may include a remote device and/or apparatus 100. In a non-limiting embodiment, downstream device may be consistent with a computing device as described in the entirety of this disclosure. Without limitation, the downstream device may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the second dashboard 148 may include displaying the second dashboard 148 at display device using a visual interface.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2A:
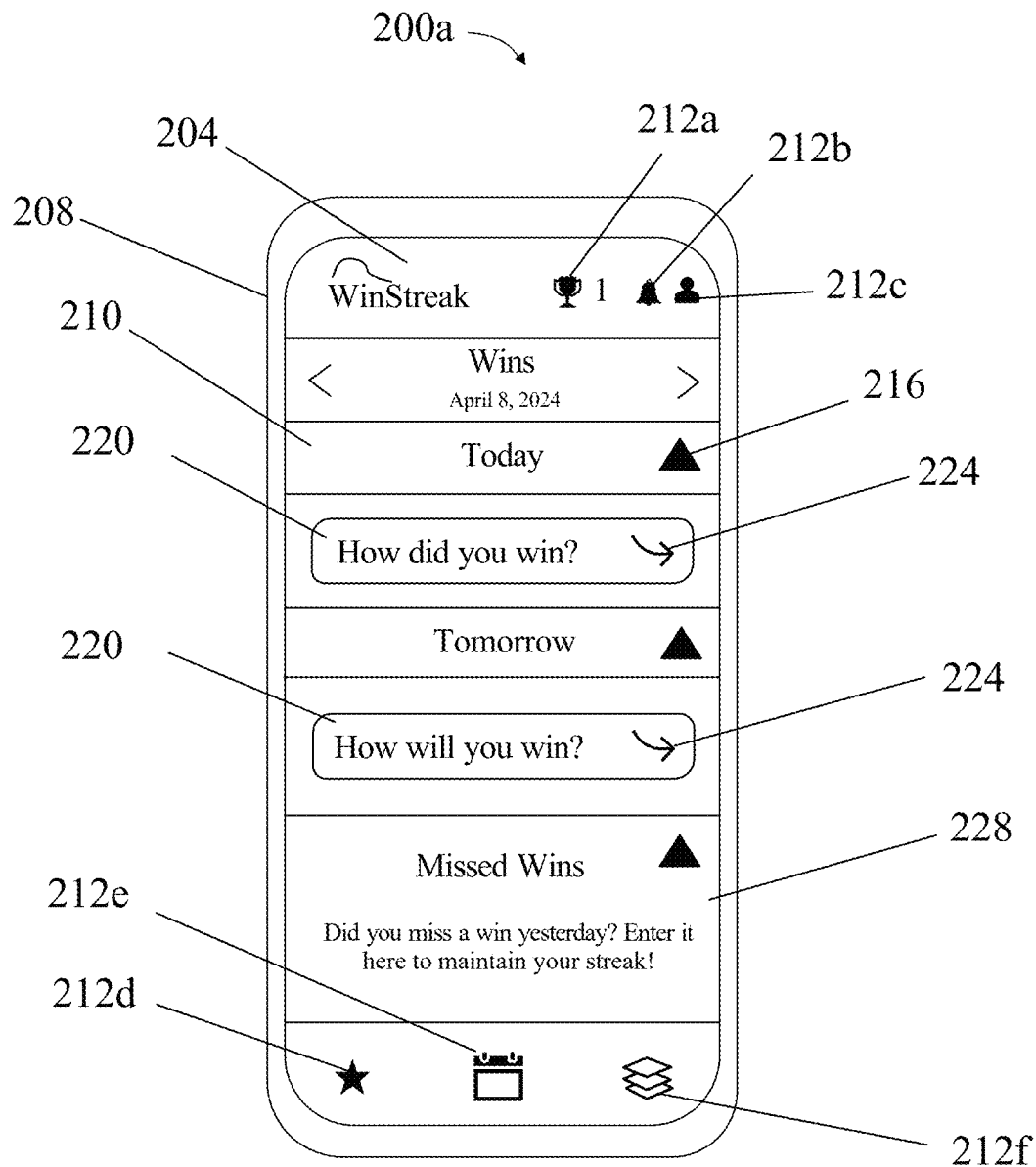
FIG. 2A is an exemplary illustration of a first dashboard displayed using a graphical user interface of a downstream device.

Referring now to FIG. 2A, an exemplary illustration 200a of a first dashboard displayed using a graphical user interface of a downstream device. In an embodiment, the first dashboard 204 may be displayed on a downstream device 208. In an embodiment, the downstream device 208 displays the first dashboard 204 using a graphical user interface 210. In an embodiment, the graphical user interface 210 may display a visual element 212. In an embodiment, the visual element 212 may include a trophy icon 212a, a bell icon 212b, a profile icon 212c, a favorites icon 212d, a calendar icon 212e, an options icon 212f, and the like. In an embodiment, the graphical user interface 210 may include a user-configurable option 216. In an embodiment, the user configurable option 216 may be an arrow that allows that user to filter and/or track their progress by the day or the task, and the like. In an embodiment, the graphical user interface 210 may include one or more prompt windows 220. In an embodiment, the graphical user interface may include one or more file input fields 224. In an embodiment, the one or more file input fields 224 may allow a user to upload daily wins and the like. In an embodiment, the graphical user interface 210 may include a backlog feature 228. In an embodiment, the backlog feature 228 may allow the user to make corrections or add information that was missed to previous days. Without limitation, the backlog feature 228 may allow users to revisit and adjust information for previous days, ensuring accurate tracking and record-keeping.

Figure 2B:
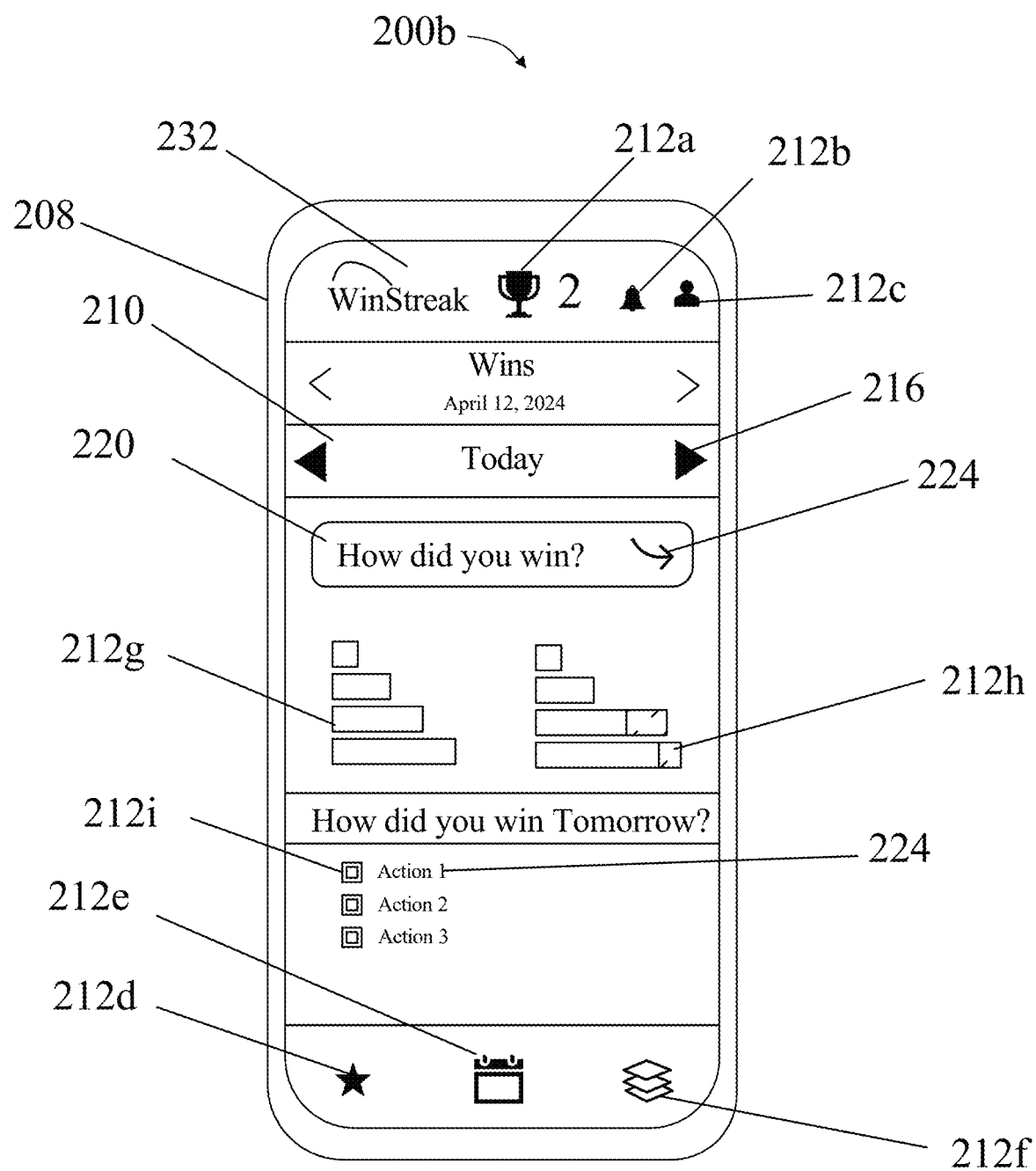
FIG. 2B is an exemplary illustration of a second dashboard displayed using a graphical user interface of a downstream device.

Referring now to FIG. 2B, an exemplary illustration 200b of a second dashboard displayed using a graphical user interface of a downstream device. In an embodiment, the second dashboard 232 may be displayed on a downstream device 208. In an embodiment, the downstream device 208 displays the second dashboard 232 using a graphical user interface 210. In an embodiment, the graphical user interface 210 may display a visual element 212. In an embodiment, the visual element 212 may include a trophy icon 212a, a bell icon 212b, a profile icon 212c, a favorites icon 212d, a calendar icon 212e, an options icon 212f, and the like. In an embodiment, the graphical user interface 210 may include a user-configurable option 216. In an embodiment, the user configurable option 216 may be an arrow that allows that user to filter and/or track their progress by the day or the task, and the like. In an embodiment, the graphical user interface 210 may include one or more prompt windows 220. In an embodiment, the graphical user interface may include one or more file input fields 224. In an embodiment, the one or more file input fields 224 may allow a user to upload daily wins and the like. In an embodiment, the graphical user interface 210 may include a backlog feature 228. In an embodiment, the backlog feature 228 may allow the user to make corrections or add information that was missed to previous days. Without limitation, the backlog feature 228 may allow users to revisit and adjust information for previous days, ensuring accurate tracking and record-keeping.

With continued reference to FIG. 2B, in an embodiment, the second dashboard 232 may be configured differently from the first to offer a more intuitive experience for the user or serve additional functional purposes. For instance, without limitation, the layout may be restructured to present key elements such as buttons, charts, or data panels in a more accessible and visually streamlined manner. Continuing, this may involve grouping related features together or placing the most frequently used controls in more prominent positions, making it easier for users to interact with the interface. Additionally and or alternatively, the navigation may be enhanced by incorporating clearer menus, tabs, shortcuts, and the like, allowing for quicker transitions between sections or views. In another non-limiting example, the second dashboard 232 may also allow for customizable widgets, giving users the flexibility to tailor the interface according to their specific needs or preferences, thereby improving usability. For example, without limitation, the second dashboard 232 may include a progress bar for the previous day 212g and a progress bar for the current day 212h to serve as a visual tool to help users track their progress over time. Without limitation, the progress bars may display how much of a given task, project, or goal was completed within the time frames of the previous day and the current day, respectively. Continuing, this visual guide may provide an at-a-glance comparison, allowing users to quickly assess whether they are staying on track or need to adjust their efforts to meet their objectives. In a non-limiting example, the progress bars may be color-coded or segmented to indicate different milestones or phases of completion, further enhancing the user's ability to understand their progress. For example, without limitation, different sections of the progress bar may represent different stages of a task or project, such as planning, execution, or review. Additionally and or alternatively, the progress bar may use colors to signal progress, such as green for completed tasks, yellow for tasks in progress, and red for overdue or missed tasks. Additionally and or alternatively, the inclusion of both a previous day and a current day progress bar may provide users with a broader perspective on their productivity trends. This may encourage more proactive behavior by highlighting areas where progress was slower on a previous day, allowing users to focus on catching up or optimizing their workflow. Continuing, this feature may be enhanced by incorporating tooltips or hover-over information, providing detailed metrics such as time spent on tasks, percentage completed, specific goals met, and the like. Continuing, the presence of these visual indicators on the second dashboard 232 may help improve time management, task prioritization, overall efficiency, and the like, making it easier for users to navigate their workload and make informed decisions about how to allocate their time and resources.

In another non-limiting example, the second dashboard 232 may include a task list 212*i*. Without limitation, the task list 212*i* may serve as a central component for organizing and managing the user's tasks. Continuing, the task list may function as an interactive checklist, allowing users to add, edit, and mark tasks as completed. Without limitation, each task may be displayed in a simple, clear format, with essential details such as due dates, priority levels, and status indicators, providing users with a comprehensive overview of their responsibilities. Continuing the task list 212*i* may be configurable, enabling users to customize how tasks are displayed, such as sorting by deadline, priority, or category. Additionally and or alternatively, the tasks may be grouped into sections or projects, allowing users to keep related actions organized and easy to navigate. Continuing, for enhanced user interaction, the task list 212*i* may support drag-and-drop functionality, enabling users to easily rearrange tasks or move them between different categories or stages of completion. In another non-limiting example, to further increase functionality, each task in the task list 212*i* may have associated features like reminders, tags, or notes, giving users the ability to add more context or set alerts for important deadlines. Continuing, the task list 212*i* may also integrate progress-tracking features, such as visual progress bars next to each task or project, allowing users to quickly see how far they are from completing their tasks. Without limitation, the task list 212*i* may be linked to other components of the second dashboard, such as a calendar view or productivity tracking tools, offering a more holistic approach to task management. For instance, when a task is marked as complete, it might automatically update progress bars or reflect in a summary panel, giving users real-time feedback on their productivity.

Figure 3:
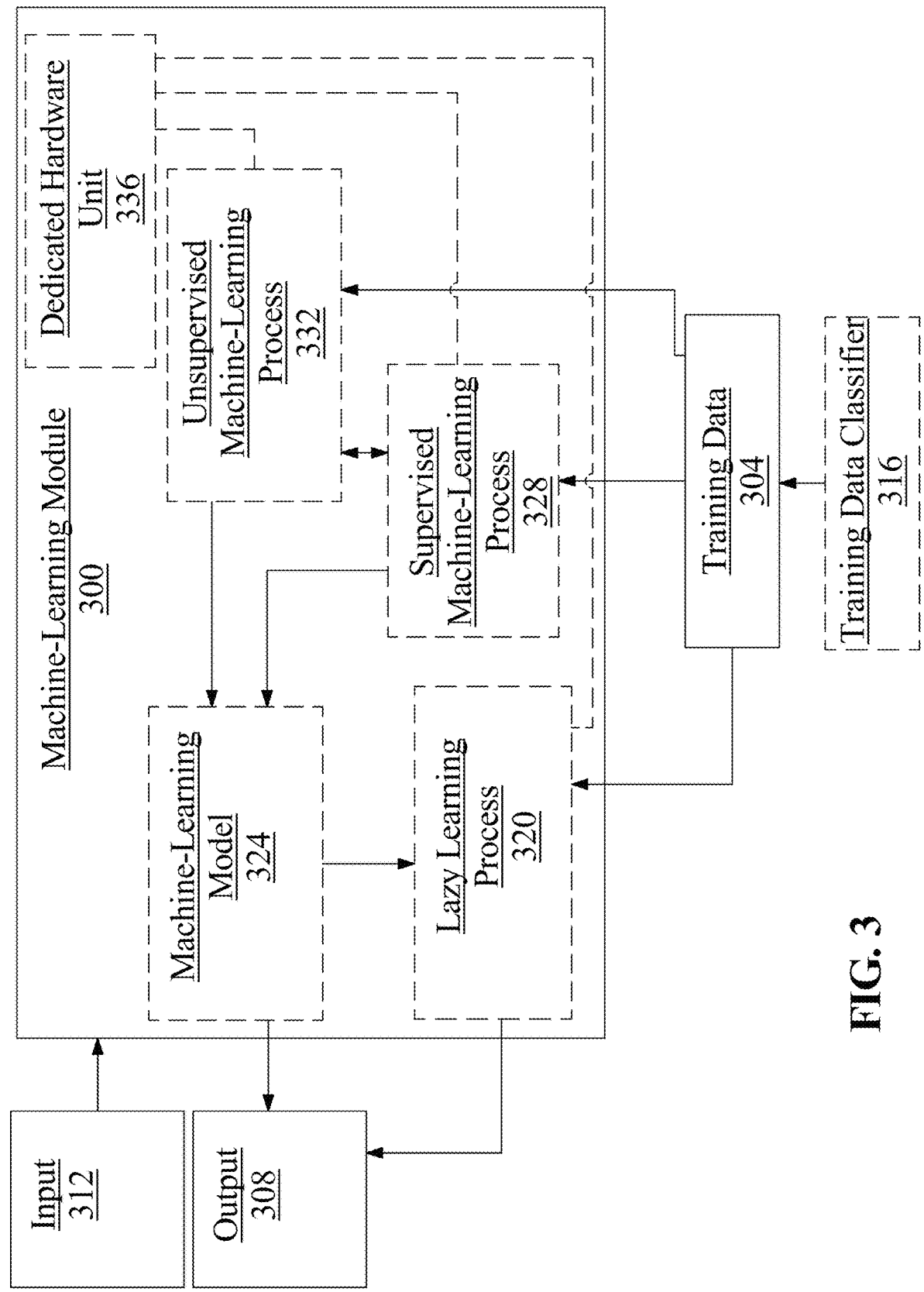
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs like first entry and/ or second entry of the plurality of log data and outputs like first plurality of categories and second plurality of categories.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to input data corresponding to category data.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being truc regardless of data also known as prior probability of A; and P (B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value Xmin in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include first entry and second entry of plurality of log data as described above as inputs, first plurality of categories and second plurality of categories as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
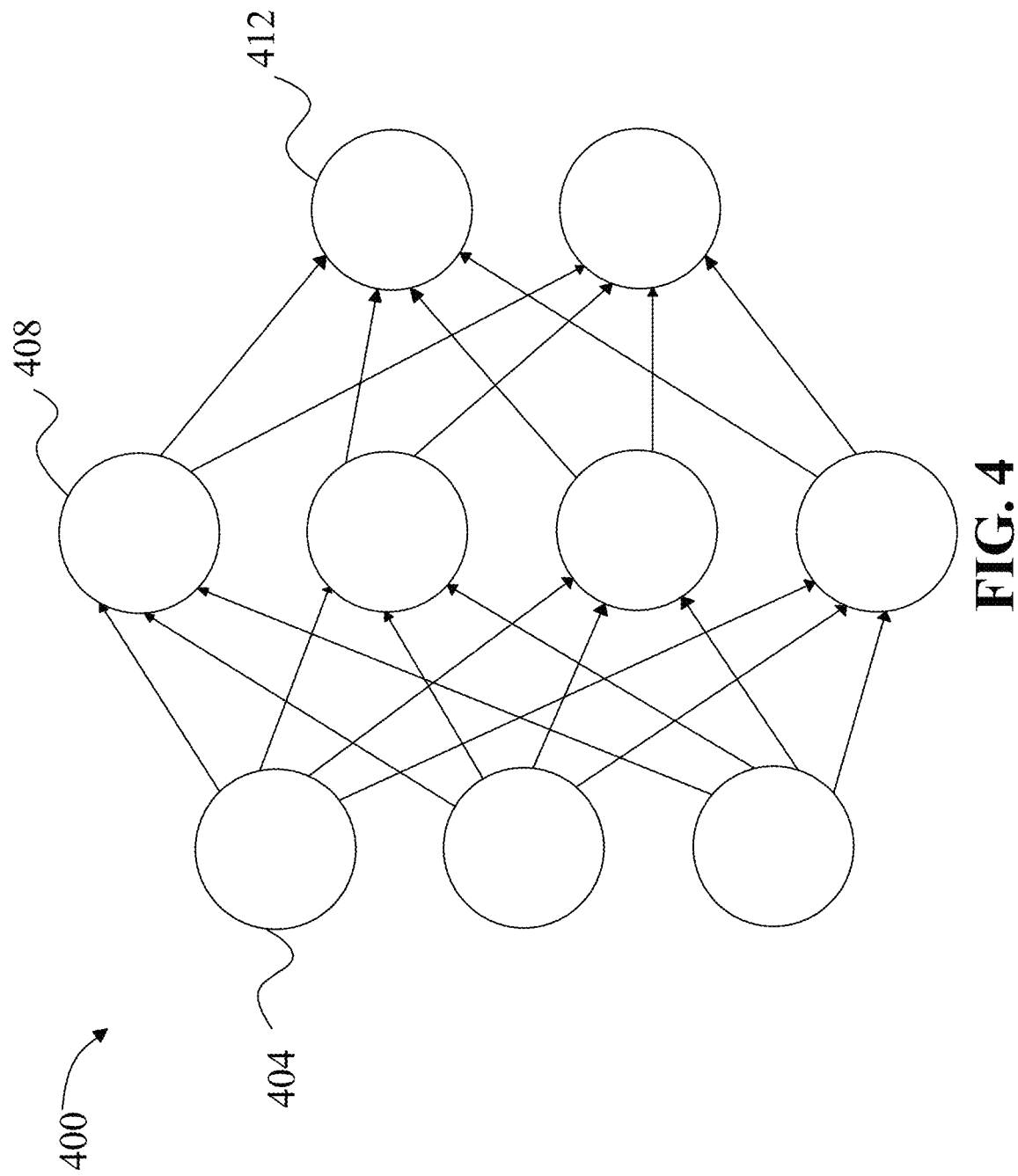
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
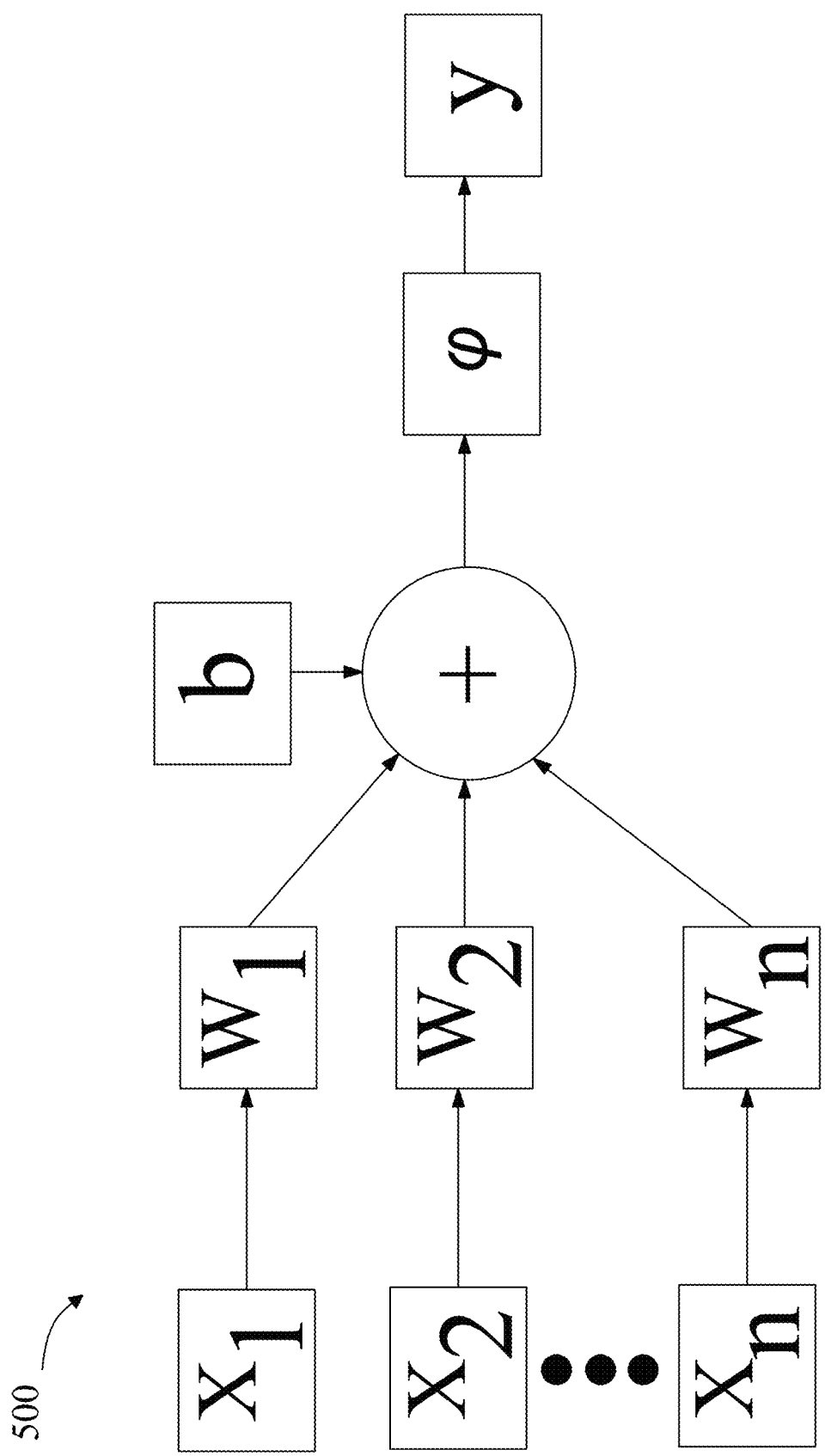
FIG. 5 is a diagram of an exemplary embodiment of a node of a neural network.

Referring now to FIG. 5, an exemplary embodiment of a node 500 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $f(x)=\{x$ for $x \geq 0_{\alpha(e}{}^x-1)$ for $x<0$ for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $$f(x) = a\left(1 + \tanh\left(\sqrt{2/\pi}\,(x + bx^r)\right)\right)$$

for some values of a, b, and r, and/or a scaled exponential linear unit function such as $f(x)=\lambda\{\alpha(e^x-1)$ for $x<0_{x\,for\,x\,\geq 0}$. Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
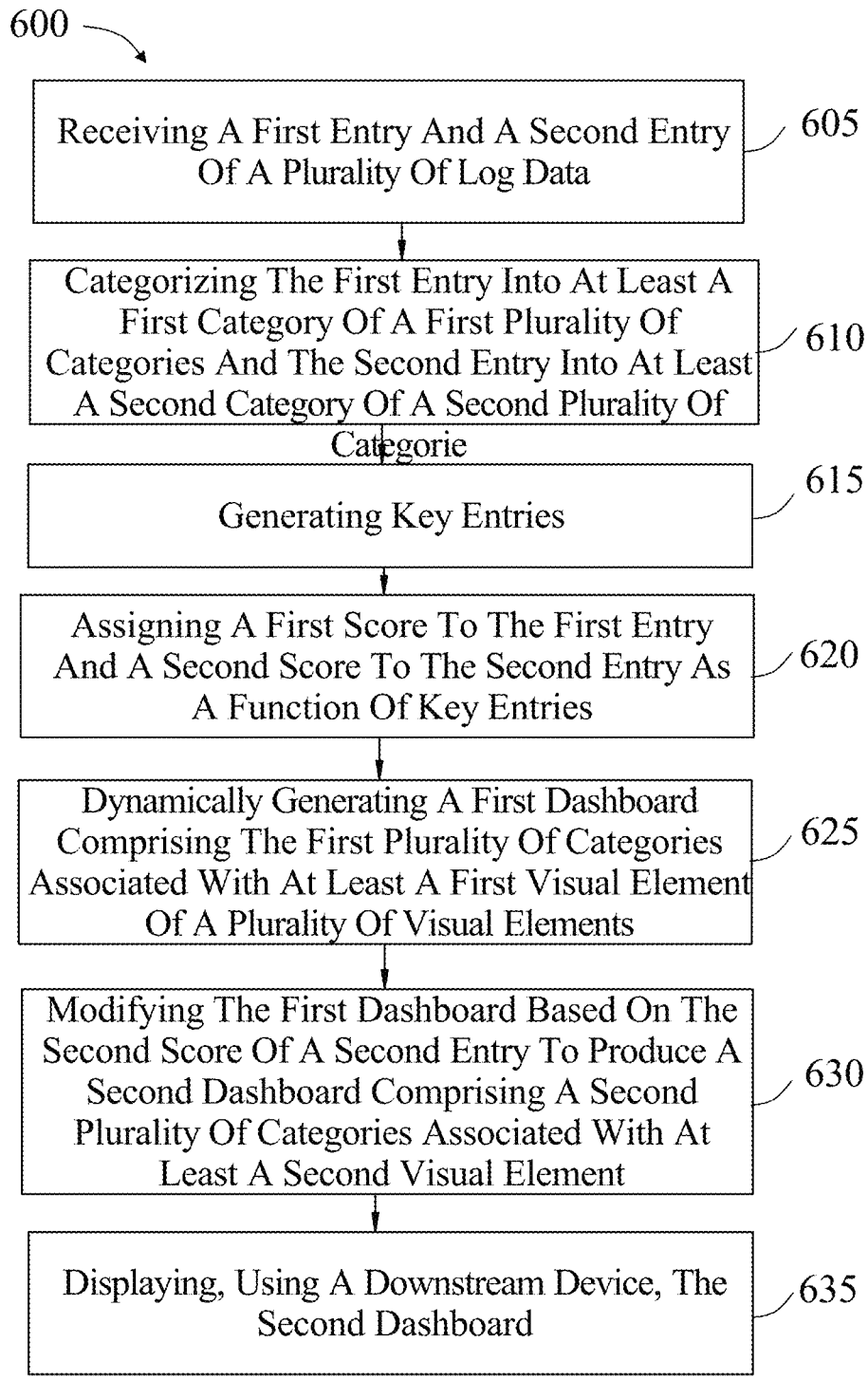
FIG. 6 is a block diagram of an exemplary method for dynamic generation of visual elements in a user-interface.

Referring now to FIG. 6, a flow diagram of an exemplary method 600 for dynamic generation of visual elements in a user-interface is illustrated. At step 605, method 600 includes receiving, using at least a processor, a first entry and a second entry of a plurality of log data. This may be implemented as described and with reference to FIGS. 1-5.

Still referring to FIG. 6, at step 610, method 600 includes categorizing, using the at least a processor, the first entry into at least a first category of a first plurality of categories and the second entry into at least a second category of a second plurality of categories. This may be implemented as described and with reference to FIGS. 1-5.

Still referring to FIG. 6, at step 615, method 600 includes generating, using the at least a processor, key entries, wherein generating key entries comprises identifying one or more correlations between an entry and at least a category. This may be implemented as described and with reference to FIGS. 1-5.

Still referring to FIG. 6, at step 620, method 600 includes assigning, using the at least a processor, a first score to the first entry and a second score to the second entry as a function of key entries. This may be implemented as described and with reference to FIGS. 1-5.

Still referring to FIG. 6, at step 625, method 600 includes dynamically generating, using a user-interface generator, a first dashboard comprising the first plurality of categories associated with at least a first visual element of a plurality of visual elements, wherein the first dashboard is generated as a function of the first score assigned to the first entry. This may be implemented as described and with reference to FIGS. 1-5.

Still referring to FIG. 6, at step 630, method 600 includes modifying, using the user interface generator, the first dashboard based on the second score of a second entry to produce a second dashboard comprising a second plurality of categories associated with at least a second visual element. This may be implemented as described and with reference to FIGS. 1-5

Still referring to FIG. 6, at step 635, method 600 includes displaying, using a downstream device, the second dashboard. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
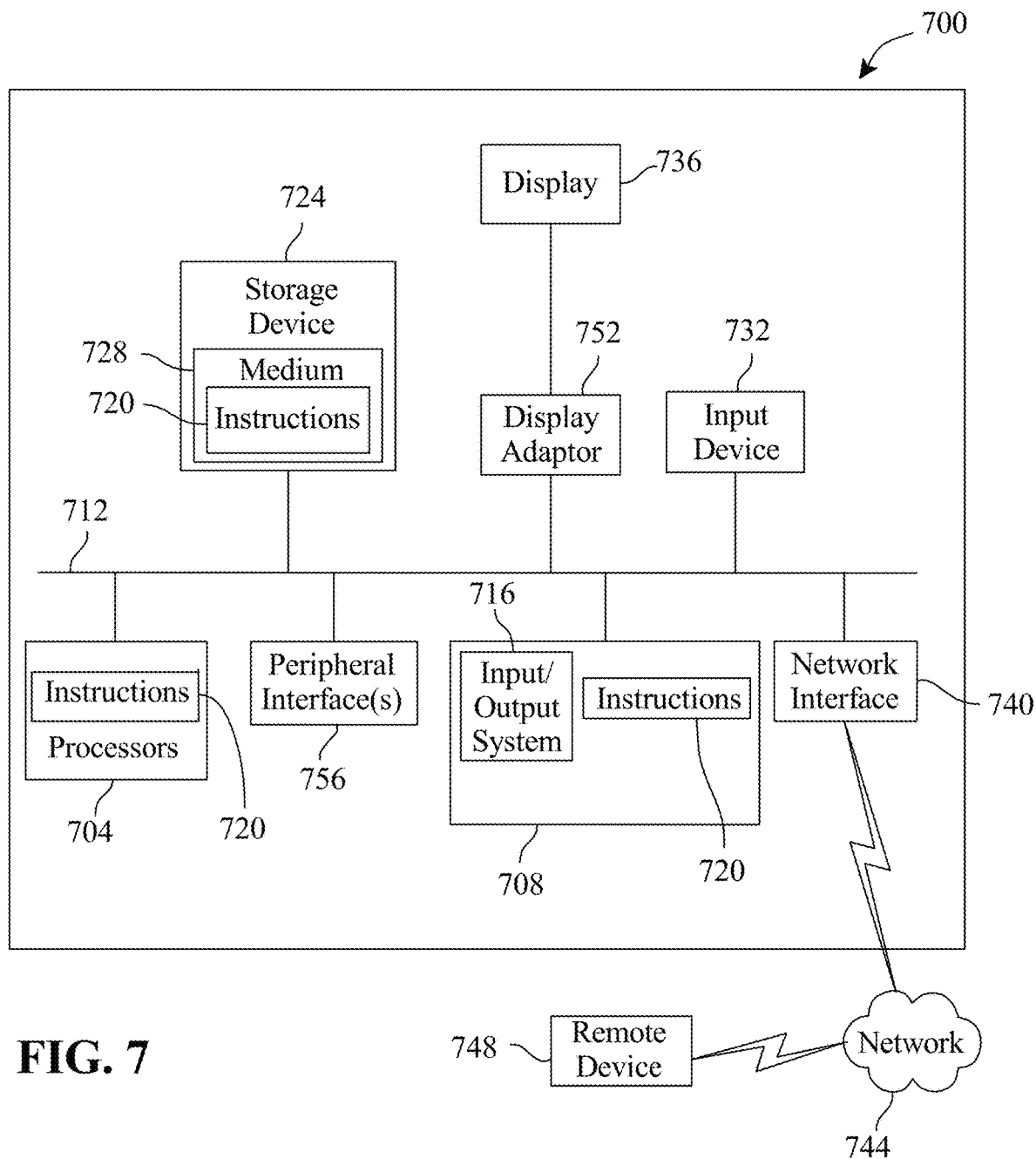
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment ($A^TA$), serial $A^TA$, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for dynamic generation of visual elements in a user-interface, wherein the apparatus comprises:
at least a computing device, wherein the computing device comprises:
a memory; and
at least a processor communicatively connected to the memory, wherein the memory contains instructions configuring the at least a processor to:
receive a first entry and a second entry of a plurality of log data;
categorize the first entry into at least a first category of a first plurality of categories and the second entry into at least a second category of a second plurality of categories;
generate key entries, wherein generating key entries comprises identifying one or more correlations between an entry and at least a category;
assign a first score to the first entry and a second score to the second entry as a function of key entries, wherein scores are weighted based on a frequency datum associated with an entry of the plurality of log data and wherein the frequency datum is prioritized by regularly occurring events when assigning scores;
dynamically generate, using an user-interface generator, a first dashboard comprising the first plurality of categories associated with at least a first visual element of a plurality of visual elements, wherein the first dashboard is generated as a function of the first score assigned to the first entry;
modify, using the user-interface generator, the first dashboard based on the second score of a second entry to produce a second dashboard comprising a second plurality of categories associated with at least a second visual element; and
display, using a downstream device, the second dashboard.

2. The apparatus of claim 1, wherein categorizing the first entry into the at least a first category of the first plurality of categories and the second entry into the at least a second category of the second plurality of categories comprises classifying the first entry and the second entry using a classifier, wherein the classifier is trained using classifier training data comprising input data corresponding to category data.

3. The apparatus of claim 2, wherein the memory contains instructions further configuring the at least a processor to generate a new category from the plurality of log data when an entry frequency threshold is met using the classifier.

4. The apparatus of claim 2, wherein the classifier comprises a Bidirectional Encoder Representations from Transformers (BERT) model configured to categorize the plurality of log data based on a contextual data analysis.

5. The apparatus of claim 1, wherein the at least a processor is further configured to:
dynamically inject data, using the user-interface generator, into one or more of the plurality of visual elements during runtime; and
update, using the user-interface generator, the plurality of visual elements in real time based on changes in the plurality of log data.

6. The apparatus of claim 1, wherein modifying the first dashboard comprises updating one or more of metadata associated with the plurality of log data, the plurality of visual elements, and a display order.

7. The apparatus of claim 1, wherein the plurality of visual elements comprise a status indicator configured to compare the plurality of log data to a second plurality of log data.

8. The apparatus of claim 1, wherein the user-interface generator is trained on user-interface generator training data comprising a plurality of categories corresponding to a plurality of dashboard configurations.

9. The apparatus of claim 1, wherein dashboards comprise at least a user-configurable option comprising a filter, wherein the filter dynamically updates the user-interface.

10. A method for dynamic generation of visual elements in a user-interface, wherein the method comprises:
receiving, using at least a processor a first entry and a second entry of a plurality of log data;
categorizing, using the at least a processor, the first entry into at least a first category of a first plurality of categories and the second entry into at least a second category of a second plurality of categories;
generating, using the at least a processor, key entries, wherein generating key entries comprises identifying one or more correlations between an entry and at least a category;
assigning, using the at least a processor, a first score to the first entry and a second score to the second entry as a function of key entries, wherein scores are weighted based on a frequency datum associated with an entry of the plurality of log data and wherein the frequency datum is prioritized by regularly occurring events when assigning scores;
dynamically generating, using an user-interface generator, a first dashboard comprising the first plurality of categories associated with at least a first visual element of a plurality of visual elements, wherein the first dashboard is generated as a function of the first score assigned to the first entry;
modifying, using the user-interface generator, the first dashboard based on the second score of a second entry to produce a second dashboard comprising a second plurality of categories associated with at least a second visual element;
displaying, using a downstream device, the second dashboard.

11. The method of claim 10, wherein categorizing the first entry into the at least a first category of the first plurality of categories and the second entry into the at least a second category of the second plurality of categories comprises classifying the first entry and the second entry using a classifier, wherein the classifier is trained using classifier training data comprising input data corresponding to category data.

12. The method of claim 11 further configured to generate a new category from the plurality of log data when an entry frequency threshold is met using the classifier.

13. The method of claim 11, wherein the classifier comprises a Bidirectional Encoder Representations from Transformers (BERT) model configured to categorize the plurality of log data based on a contextual data analysis.

14. The method of claim 10 further configured to:
dynamically inject data, using the user-interface generator, into one or more of the plurality of visual elements during runtime; and
update, using the user-interface generator, the plurality of visual elements in real time based on changes in the plurality of log data.

15. The method of claim 10, wherein modifying the first dashboard comprises updating one or more of metadata associated with the plurality of log data, the plurality of visual elements, and a display order.

16. The method of claim 10, wherein the plurality of visual elements comprise a status indicator configured to compare the plurality of log data to a second plurality of log data.

17. The method of claim 10, wherein the user-interface generator is trained on user-interface generator training data comprising a plurality of categories corresponding to a plurality of dashboard configurations.

18. The method of claim 10, wherein dashboards comprise at least a user-configurable option comprising a filter, wherein the filter dynamically updates the user-interface.

* * * * *